UNITED STATES PATENT OFFICE 2,573,855

PROCESS OF AND BATCH FOR MAKING AMBER GLASS

Aaron K. Lyle, West Hartford, Conn., assignor to Emhart Manufacturing Company, a corporation of Delaware No Drawing. Application May 18, 1946,
Serial No. 670,844

6 Claims. (Cl. 106—52)

The invention relates to the making of colored glasses of the type usually referred to as carbon-sulfur amber and particularly to novel ingredients for producing the amber coloration.

Heretofore amber coloration has been produced by the addition of reducing agents, such as graphite, powdered coal or other carbon-bearing materials, and sulfur or compounds of sulfur, such as iron sulfide and sodium sulfate, to to a batch for making an ordinary substantially colorless sand-soda-lime glass and melting in the usual manner. This practice produces variable results depending on the conditions under which the glass is melted and on the relative purity of the coloring ingredients used, with the result that batch mixture used for making amber glasses may vary widely in the amounts and relative proportions of the coloring ingredients. Furthermore, the impurities in the coloring ingredients are subject to variation from time to time which causes changes in the character and intensity of the coloration It is generally held that the color of amber glass is due to the presence of sulfur in some reduced form, such as a sulfide or a polysulfide, and that a reducing agent is necessary to production of the color but that the reducing agent does not in itself give rise to the coloration.

An object of the invention is to provide improved coloring ingredients for amber glass of the carbon-sulfur type.

A more specific object is to eliminate the necessity of using separate reducing and coloring ingredients and to provide a class of ingredients which may be used singly to provide the desired coloration.

I have discovered that the sulphocyanates, particularly those of ammonium, sodium, potassium, calcium, and barium, constitute a class of compounds which when added to a batch for making an ordinary substantially colorless sand-soda-lime glass produce amber coloration. The term "sand-soda-lime glass" is used in its ordinary or broad sense and includes those glasses which in addition to their chief constituents, silica, calcia and soda may contain in many cases alumina, magnesia, barium oxide, boric oxide, and potassium oxide in relatively minor proportions but in excess of the proportions that may be derived adventitiously.

A number of glasses having amber coloration produced by the addition of sulphocyanate have been prepared. Examples of batches that have been made are listed in the following table.

|  | I | II | III | IV | V | VI | VII | VIII |
|---|---|---|---|---|---|---|---|---|
| Sand | 1,000 | 1,000 | 1,000 | 1,000 | 1,000 | 1,000 | 1,000 | 1,000 |
| Soda Ash | 306 | 306 | 306 | 218 | 327 | 322 | 337 | 355 |
| Potash |  |  |  | 90 |  |  |  |  |
| Limestone | 159 | 159 |  | 159 | 302 | 273 | 250 | 248 |
| Burnt Dolomite |  |  | 95 |  |  |  |  |  |
| Borax |  |  |  |  |  |  |  | 22 |
| Feldspar | 175 | 175 | 175 | 175 | 51 | 49 | 95 | 125 |
| Fluorspar | 15 | 15 | 15 | 15 |  |  | 15 |  |
| Ammonium sulphocyanate | 7 |  |  |  | 7 |  | 15 | 12 |
| Sodium sulphocyanate |  | 7.5 |  |  |  |  |  |  |
| Potassium sulphocyanate |  |  |  | 9.1 |  |  |  |  |
| Calcium sulphocyanate |  |  |  |  |  | 26 |  |  |
| Barium sulphocyanate |  |  | 13.5 |  |  |  |  |  |

The batch of the examples are easy to melt and fine and may be produced in ordinary furnaces at temperatures ranging from approximately 2500 to approximately 2900° F. The resulting glasses are all red ambers practically free of seeds and related defects. Furthermore, in these batches the coloring materials are free of discoloring or otherwise undesirable impurities and the carbon and sulfur are introduced in a constant ratio of 1.12:3 into the batch.

The results obtained from the batches tested including those set forth in the table, indicate that the ammonium, alkali and alkaline earth sulphocyanates will impart the necessary reducing and coloring ingredients to an amber glass batch. Sulphocyanates of such elements as aluminum and magnesium may also be used.

Since it is known that ammonium, aluminum, and magnesium, as well as sodium, potassium, calcium, barium, and the other alkalis and alkali earth ions produce no color in themselves, it is believed that the coloring action is caused by the chemical and thermal reactions of the sulphocyanate radical during the melting of the glass. The introduction of ions, such as copper or iron, which in themselves color glasses or the use of ions, such as zinc, antimony or arsenic, which bleach the color of amber glasses preferably are avoided.

Examples I–VIII indicate that a sulphocyanate of any metal or radical may be used as the amber coloring ingredients save only those metals and radicals which are themselves dominant bleaching agents or coloring agents of colors other than amber.

While there have been listed herein varying batch compositions embodying the present invention, and while specific constituent ratios for these batches have been set forth, it is to be understood that they are merely illustrative and that the invention is to be measured by the scope of the appended claims, which are to be construed as broadly as the state of the prior art permits.

I claim:

1. A batch for making amber glass comprising materials for a substantially colorless sand-soda-lime glass together with approximately 7½ parts by weight of sodium sulphocyanate per 1000 parts of sand.

2. A batch for making amber glass including a batch for a substantially colorless sand-soda-lime glass together with ammonium sulphocyanate, the sulphocyanate being in the range of 7 to 15 parts by weight per 1000 parts of sand.

3. A batch for making amber glass comprising a sand-soda-lime batch for substantially colorless glass together with approximately 9.1 parts by weight of potassium sulphocyanate per 1000 parts of sand.

4. A batch for making amber glass comprising a sand-soda-lime batch for substantially colorless glass together with 13.5 parts by weight of barium sulphocyanate per 1000 parts of sand.

5. A batch for making amber glass which comprises a batch for substantially colorless sand-soda-lime glass together with sulphocyanate from the group consisting of the sulphocyanates of ammonium, sodium, potassium, calcium and barium, the sulphur content of the sulphocyanate being sufficient to produce amber coloration and being in the approximate range of 3 to 8 parts by weight of sulfur per 1000 parts of sand.

6. The process of making an amber-colored glass which comprises melting a mixture of glass forming ingredients for a substantially colorless sand-soda-lime glass together with sulphocyanate from the group consisting of the sulphocyanates of ammonium, sodium, potassium, calcium and barium, the sulfur content of the sulphocyanate being sufficient to produce amber coloration and being in the approximate range of 3 to 8 parts by weight of sulfur per 1000 parts of sand.

AARON K. LYLE.

REFERENCES CITED

The following references are of record in the file of this patent:

UNITED STATES PATENTS

| Number | Name | Date |
|---|---|---|
| 2,174,517 | Koethen et al. | Oct. 3, 1939 |
| 2,174,554 | Dobrovolny et al. | Oct. 3, 1939 |
| 2,224,791 | Loffler | Dec. 10, 1940 |

FOREIGN PATENTS

| Number | Country | Date |
|---|---|---|
| 668,593 | Germany | 1938 |